(12) United States Patent
Hsu et al.

(10) Patent No.: US 8,716,907 B2
(45) Date of Patent: May 6, 2014

(54) RENEWABLE ENERGY ENHANCED APPARATUS

(76) Inventors: Fu-Tzu Hsu, Taipei (TW); Chien-Sen Tu, New Taipei (TW)

( * ) Notice: Subject to any disclaimer, the term of this patent is extended or adjusted under 35 U.S.C. 154(b) by 418 days.

(21) Appl. No.: 13/159,073

(22) Filed: Jun. 13, 2011

(65) Prior Publication Data

US 2012/0313436 A1    Dec. 13, 2012

(51) Int. Cl.
  *H01H 3/26*    (2006.01)
(52) U.S. Cl.
  USPC .......................................................... 307/140
(58) Field of Classification Search
  USPC ............................................................. 307/82
  See application file for complete search history.

(56) References Cited

U.S. PATENT DOCUMENTS

RE41,965 E * 11/2010 West ................................. 307/64
2010/0270864 A1* 10/2010 Vyas et al. ....................... 307/82

* cited by examiner

Primary Examiner — Robert L. Deberadinis
(74) Attorney, Agent, or Firm — WPAT, PC; Justin King

(57) ABSTRACT

A renewable energy enhanced apparatus includes a rechargeable buffer battery unit; a renewable energy generation unit for generating electric energy in the form of a cell; a rectifying and charging unit for converting AC into DC and charging the DC into the buffer battery unit; a power conversion and energy multiplication unit for converting electric energy into electric power, so as to couple out electric power and upgrade the power efficiency of a renewable energy power plant; and an electric power output unit for converting the electric power into low-frequency normal electric power for use. The renewable energy enhanced apparatus also includes an electrical damper for absorbing and recycling any anti-electromotive force and eddy current produced due to a load effect, in order to form another renewable energy for reuse, so as to upgrade the power efficiency of a renewable energy power plant.

10 Claims, 6 Drawing Sheets

RENEWABLE ENERGY ENHANCED APPARATUS

FIELD OF THE INVENTION

The present invention relates to a renewable energy enhanced apparatus that uses renewable energy as a main input for generating electric energy in the form of a cell, and uses an energy to power conversion mechanism and the sampling theorem to couple out electric power using an operating frequency higher than the frequency of normal electric power, so as to upgrade the power efficiency of a renewable energy power plant.

BACKGROUND OF THE INVENTION

A currently available renewable energy conversion generator is a charger connected to a public power supply and controlled by a timer to charge more than one battery. The power stored in the battery is supplied to a direct-current (DC) motor via control of a motor controller, so that the DC motor operates to drive an alternating-current (AC) generator. The power generated by the AC generator is distributed to loads via a power distribution panel. Taking a wind energy power generation system as an example, there is included an AC generator, the power generated by which belongs to cell instead of battery and could not be used as normal electric power. Further, taking the solar energy power generation system as an example, the power generated by which belongs to cell instead of battery and could not be used as normal electric power, either. The power generation efficiency of these systems is always a problem. To overcome this problem, there are two solutions, one of which is to store the generated power in a battery for use as a backup power, and the other one of which is to directly use the generated power to drive a DC motor to reach a predetermined high rotational speed, so that the inertia acceleration of a counterweight flywheel rotating at high speed causes the DC motor to effortlessly and stably drive a permanent-magnet generator to operate and generate power (this type of generator is usually referred to as a flywheel generator or FWG). Therefore, the power generated from renewable energy can be stored as backup power during the off-peak hours, and the stored power is high-efficiently converted into the power supply required by loads during the on-peak hours.

Generally speaking, the currently available backup power conversion and output unit is mainly characterized in that the backup power stored in the battery is controlled by the motor controller for outputting to the DC motor for the same to operate, and then, the large torque of the inertia in motion of the counterweight flywheel mounted on the output shaft of the DC motor is utilized to drive the permanent-magnet generator to generate electric power, which is then distributed via a power distribution panel to AC loads as the power supply thereof. Basically, in the whole backup power conversion process of the conventional power conversion and output unit, some of the power is consumed to maintain constant operation of the motor, and the backup power is not really converted and utilized in the most power-saving or the most efficient manner. In other words, the power stored in the battery can only be used as backup power instead of the normal power supply. Further, the conditional factor for nonlinear control comes from the operation of the generator for generating power for use by loads. The higher the power generation is, the higher the load capacity of the motor will be; and the lower the power generation is, the lower the load capacity of the motor will be. Under this condition, when the generator works in the nonlinear operation mode, the generated electric energy is very unstable, the frequent change in the potential at the loads would inevitably result in abnormal or overlarge surge in the power output circuit to adversely affect the stability of power output. In the event this type of surge is not buffered or eliminated, the generator tends to be subject to instantaneous overload and become burned out. Apparently, for the conventional backup power conversion and output unit to extend the best energy-saving effect, it is necessary to solve the problem of anti-electromotive force or eddy current that is produced when the motor is nonlinearly controlled, and to buffer or eliminate the abnormal or overlarge surge in the nonlinear generator. Otherwise, the backup power conversion and output unit will only be a power conversion unit or even an energy-consuming unit.

SUMMARY OF THE INVENTION

A primary object of the present invention is to provide a renewable energy enhanced apparatus that combines the above-mentioned two conventional solutions to use renewable energy as a main input for generating electric energy in the form of a cell, and uses an energy to power conversion mechanism and the sampling theorem to couple out electric power using an operating frequency higher than the frequency of normal electric power, so as to upgrade the power efficiency of a renewable energy power plant.

To achieve the above and other objects, the renewable energy enhanced apparatus according to the present invention uses renewable energy as a main input and includes a buffer battery unit, a renewable energy generation unit, a rectifying and charging unit, a power conversion and energy multiplication unit, and an electric power output unit. The buffer battery unit is a rechargeable battery that can be repeatedly charged and discharged. The renewable energy generation unit uses the renewable energy input to generate electric energy in the form of a cell. The rectifying and charging unit converts AC into DC and charges the DC into the buffer battery unit for storage. The power conversion and energy multiplication unit converts electric energy into electric power to couple out the electric power.

In the present invention, the renewable energy generation unit is a wind turbine and/or solar cells.

In the present invention, the electric energy in the form of a cell output from the renewable energy is charged into the buffer battery unit via the rectifying and charging unit, and is converted by the power conversion and energy multiplication unit into electric power for output. The electric energy obtained from the input renewable energy has a frequency higher than the frequency of normal electric power. However, via the rectifying and charging unit, stable electric energy can be stored in the buffer battery unit. Further, via the power conversion and energy multiplication unit, electric power can be coupled out to upgrade the power efficiency of a renewable energy power plant.

In an embodiment of the present invention, the power conversion and energy multiplication unit includes an electrical damper for timely absorbing any anti-electromotive force and eddy current produced due to a load effect, and recycling the absorbed anti-electromotive force and eddy current to form another renewable energy for reuse. In this manner, it is able to further increase the power efficiency of the renewable energy power plant.

In an embodiment of the present invention, the power conversion and energy multiplication unit includes an intermediate-frequency converter having an operating frequency higher than the frequency of normal electric power, and an intermediate-frequency transformer coordinately operating with the intermediate-frequency converter; and the electric power output unit includes a low-frequency inverter having an operating frequency the same as the frequency of normal electric power, and a low-frequency transformer coordinately operating with the low-frequency inverter.

In another embodiment of the present invention, the power conversion and energy multiplication unit includes a motor servo and a DC permanent-magnet motor driven by the motor servo to operate; and the electric power output unit includes a low-frequency alternator having an operating frequency the same as the frequency of normal electric power.

Compared to the currently available renewable energy conversion generators, the renewable energy enhanced apparatus of the present invention is characterized in that it converts the electric energy output from the renewable energy into electric power for outputting. More specifically, the power conversion and energy multiplication unit enables increased electric energy storage speed and converts electric energy into electric power output, and the electric power output unit converts the electric power output of an intermediate frequency into the low-frequency normal electric power for use as power supply. The present invention also includes a damper to timely absorb or eliminate any produced anti-electromotive force or eddy current, which is recycled for reuse, so as to further increase the power efficiency of the renewable energy power plant.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
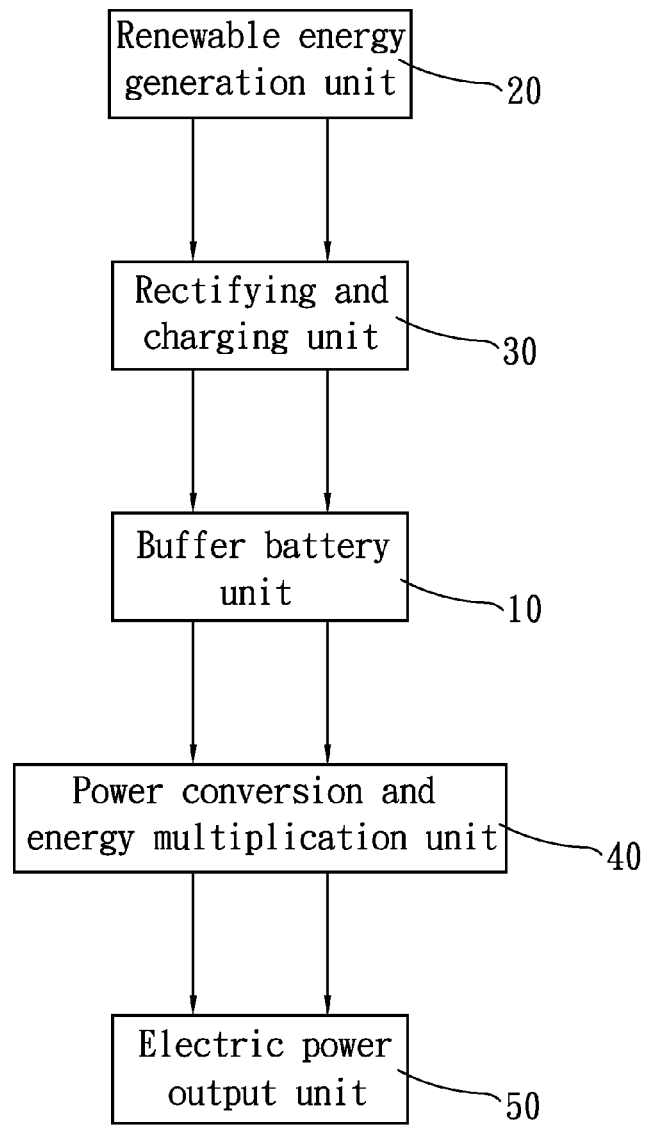
FIG. 1 is a system diagram of the present invention.

The present invention will now be described with some preferred embodiments thereof and with reference to the accompanying drawings. For the purpose of easy to understand, elements that are the same in the preferred embodiments are denoted by the same reference numerals.

Figure 2:
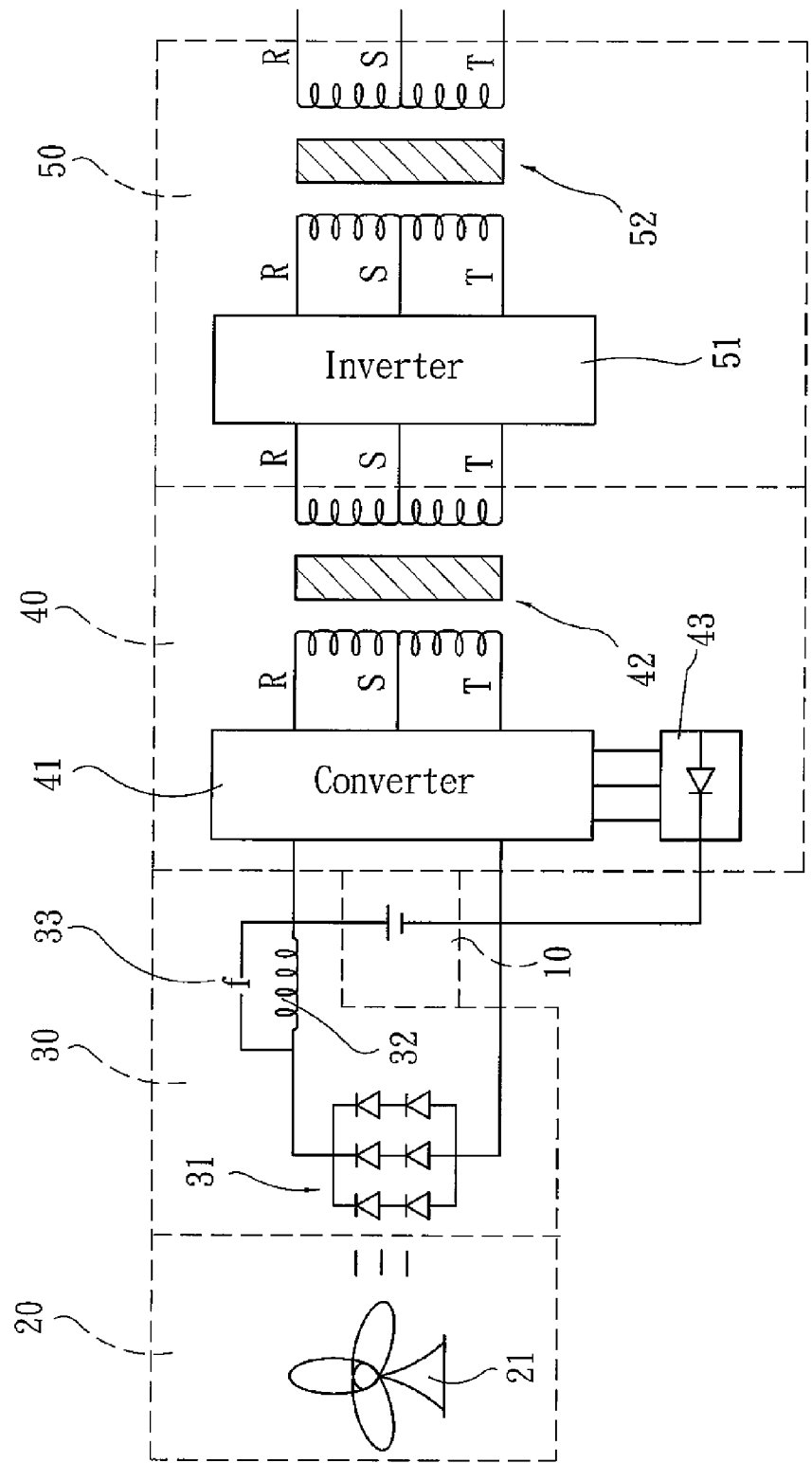
FIG. 2 is a structure diagram of a first embodiment of the present invention.

Please refer to FIGS. 1 and 2. The present invention relates to a renewable energy enhanced apparatus that uses a renewable energy as a main input. As shown in FIG. 1, the renewable energy enhanced apparatus of the present invention includes a buffer battery unit 10, a renewable energy generation unit 20, a rectifying and charging unit 30, a power conversion and energy multiplication unit 40, and an electric power output unit 50. The buffer battery unit 10 is a rechargeable battery that can be repeatedly charged and discharged. The renewable energy generation unit 20 is able to generate electric energy in the form of a cell. The renewable energy unit 20 can be a wind turbine and/or solar cells. The rectifying and charging unit 30 is able to convert alternating current (AC) into direct current (DC) and charge the converted DC into the buffer battery unit 10 for storage. The power conversion and energy multiplication unit 40 is a controller having an operating frequency higher than the frequency of normal electric power, and is able to increase the speed of storing the electric energy in the buffer battery unit 10 and convert electric energy into electric power to thereby couple out electric power. The electric power output unit 50 is able to convert the electric power output by the power conversion and energy multiplication unit 40 into the low-frequency normal electric power for use.

With the present invention, the electric energy generated from the renewable energy is in the form of a cell, and is rectified into DC form for charging into the buffer battery unit 10, and can be converted into electric power by the power conversion and energy multiplication unit 40 for outputting. The electric energy output from the input renewable energy has an energy frequency higher than the frequency of normal electric power, and is rectified by the rectifying and charging unit 30 into stable electric energy for storing in the buffer battery unit 10. And, the power conversion and energy multiplication unit 40 couples out electric power, so as to upgrade the power efficiency of a renewable energy power plant.

FIG. 2 is a structure diagram of a first embodiment of the present invention. As shown, in the first embodiment, the renewable energy generation unit 20 is a wind turbine 21. The rectifying and charging unit 30 includes rectifiers 31, a susceptance-type inductor 32, and a high-frequency filter 33. The rectifiers 31 rectify the wind energy cell into DC form, and the susceptance-type inductor 32 stores the electric energy in the buffer battery unit 10. The above actions are actuated by the power conversion and energy multiplication unit 40, so that the electric energy is more quickly stored in the buffer battery unit 10. The power conversion and energy multiplication unit 40 includes an intermediate-frequency converter 41 having an operating frequency higher than the frequency of normal electric power; and an intermediate-frequency transformer 42 coordinately operating with the intermediate-frequency converter 41. The intermediate-frequency converter 41 is a DC-to-AC converter enabling quicker transmission of the electric energy. The intermediate-frequency transformer 42 is able to couple out electric power. The electric power output unit 50 includes a low-frequency inverter 51 having an operating frequency the same as the frequency of normal electric power, and a low-frequency transformer 52 coordinately operating with the low-frequency inverter 51. The low-frequency inverter 51 is a DC-to-AC inverter, and coordinately operates with the low-frequency transformer 52 to couple out electric power having a frequency the same as the low-frequency normal electric power. The power conversion and energy multiplication unit 40 further includes an electrical damper 43 for timely absorbing any anti-electromotive force and eddy current produced due to a load effect, and recycling the absorbed anti-electromotive force and eddy current to form another renewable energy for reuse. In this manner, it is able to further increase the power efficiency of the renewable energy power plant.

The electric energy in the form of a cell being referred to in the present invention is output from the renewable energy. The use of electric energy as electric power would encounter the problem stated in the maximum power transfer theorem (MPTT). In the present invention, the DC-to-AC low-frequency inverter 51 has an operating frequency the same as that of the normal electric power and coordinately operates with the low-frequency isolation transformer 52 to couple out electric power. According to the mechanism of the present invention for converting electric energy into electric power, the electric energy output from the renewable energy is stored in the buffer battery unit 10, and the intermediate-frequency converter 41 having an operating frequency higher than the frequency of normal electric power is used to couple out the electric energy via the intermediate-frequency transformer 42 according to the sampling theorem.

Figure 3:
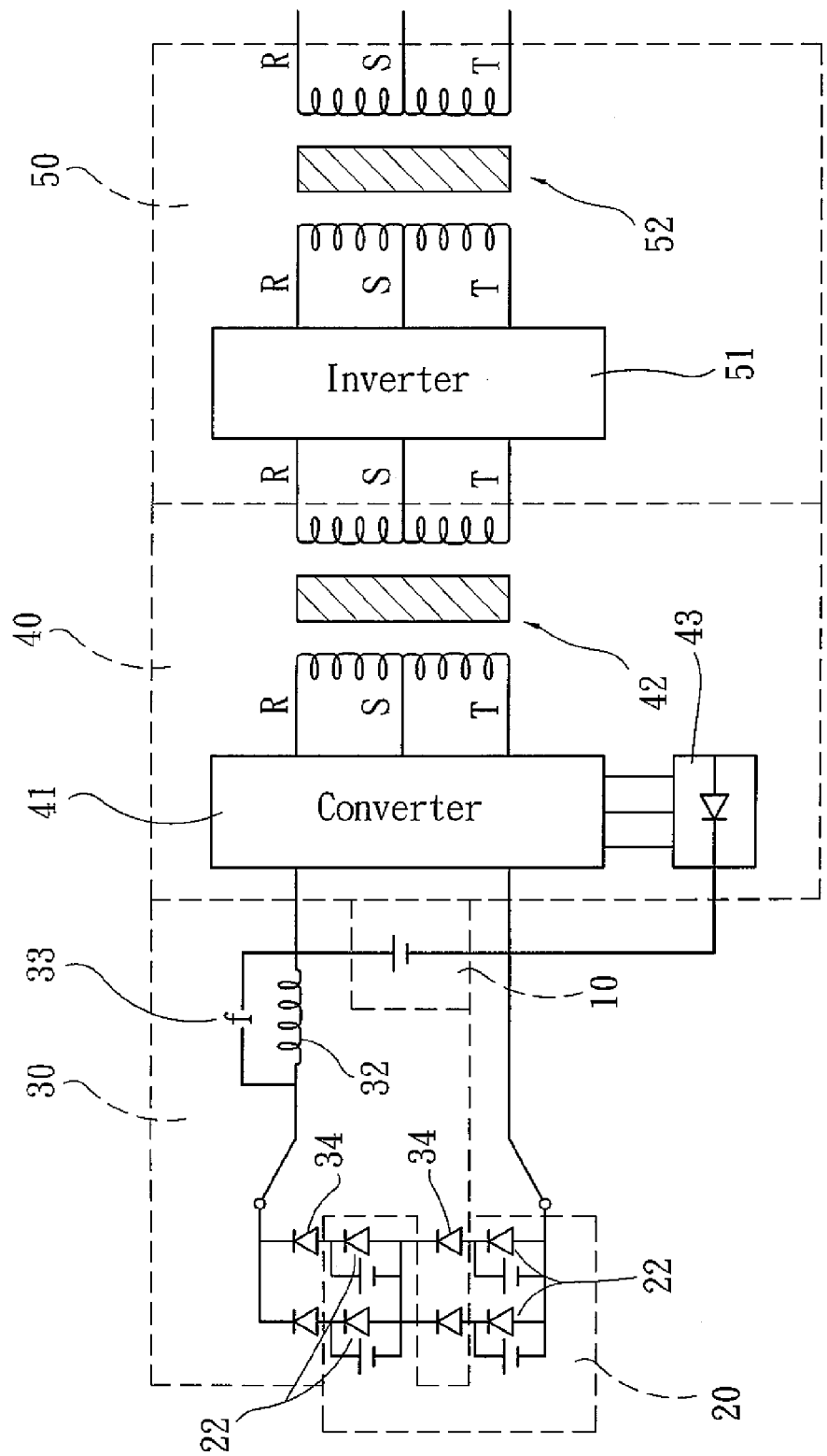
FIG. 3 is a structure diagram of a second embodiment of the present invention.

FIG. 3 is a structure diagram of a second embodiment of the present invention. The second embodiment is similar to the first embodiment, except that the renewable energy generation unit 20 includes a plurality of solar cells 22, and the rectifying and charging unit 30 includes rectifiers 34, a susceptance-type inductor 32, and a high-frequency filter 33. The rectifiers 34 in the rectifying and charging unit 30 may be arranged in the solar cells. The buffer battery unit 10 may be composed of a buffer battery and a buffer capacitor connected to the buffer battery in parallel.

Figure 4:
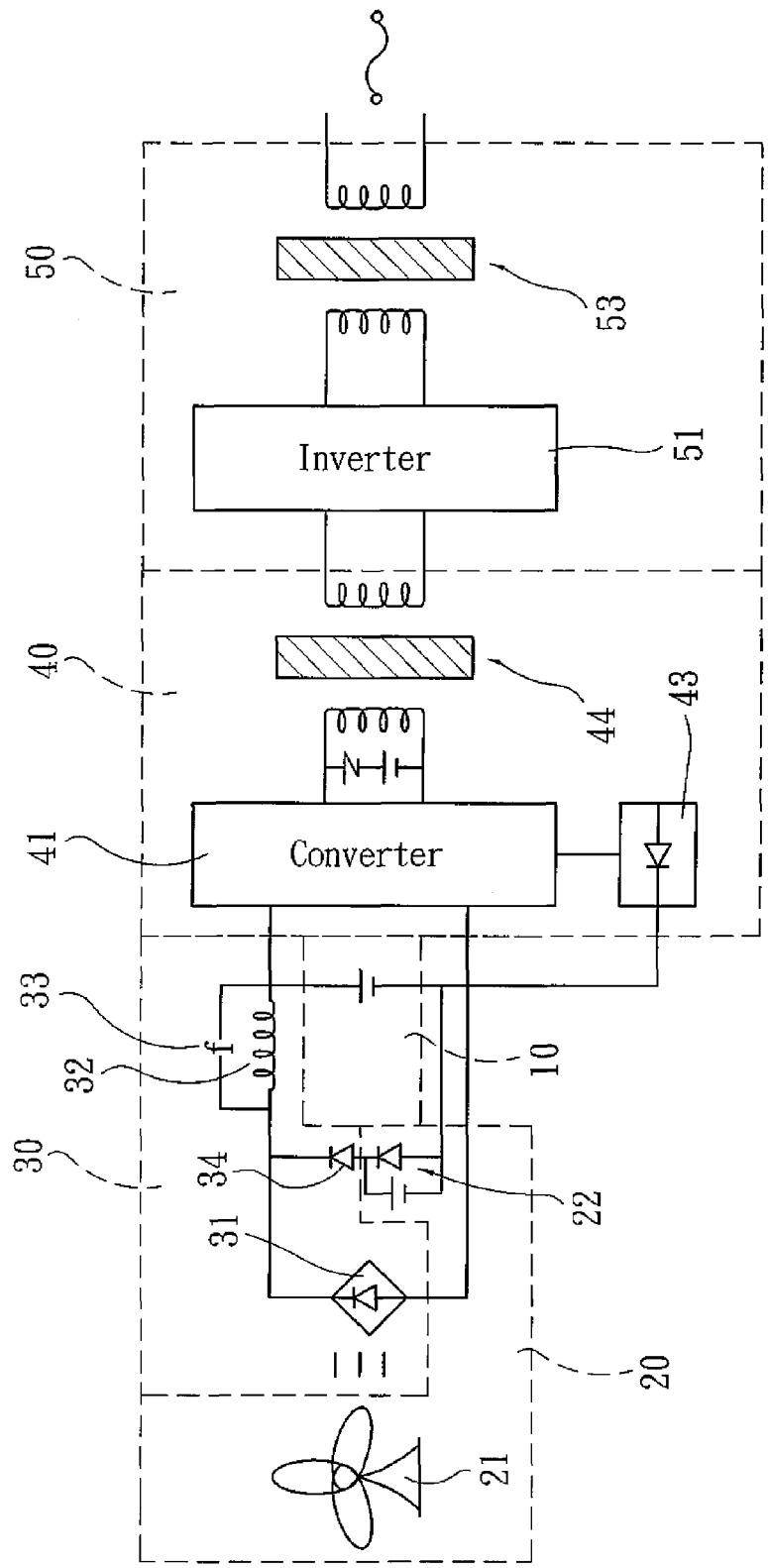
FIG. 4 is a structure diagram of a third embodiment of the present invention.

FIG. 4 is a structure diagram of a third embodiment of the present invention. In the third embodiment, the renewable energy generation unit 20 includes a wind turbine 21 and a solar cell 22. The rectifying and charging unit 30 includes rectifiers 31 and 34, a susceptance-type inductor 32 and a high-frequency filter 33 for storing the electric energy in the buffer battery unit 10. The power conversion and energy multiplication unit 40 includes an intermediate-frequency converter 41 having an operating frequency higher than the frequency of normal electric power, and an intermediate-frequency transformer 44 coordinately operating with the intermediate-frequency converter 41. The electric power output unit 50 includes a low-frequency inverter 51 having an operating frequency the same as the frequency of normal electric power, and a low-frequency transformer 53 coordinately operating with the low-frequency inverter 51, so as to couple out electric power having a frequency the same as the low-frequency normal electric power for use. In FIG. 4, component 43 is a damper.

Figure 5:
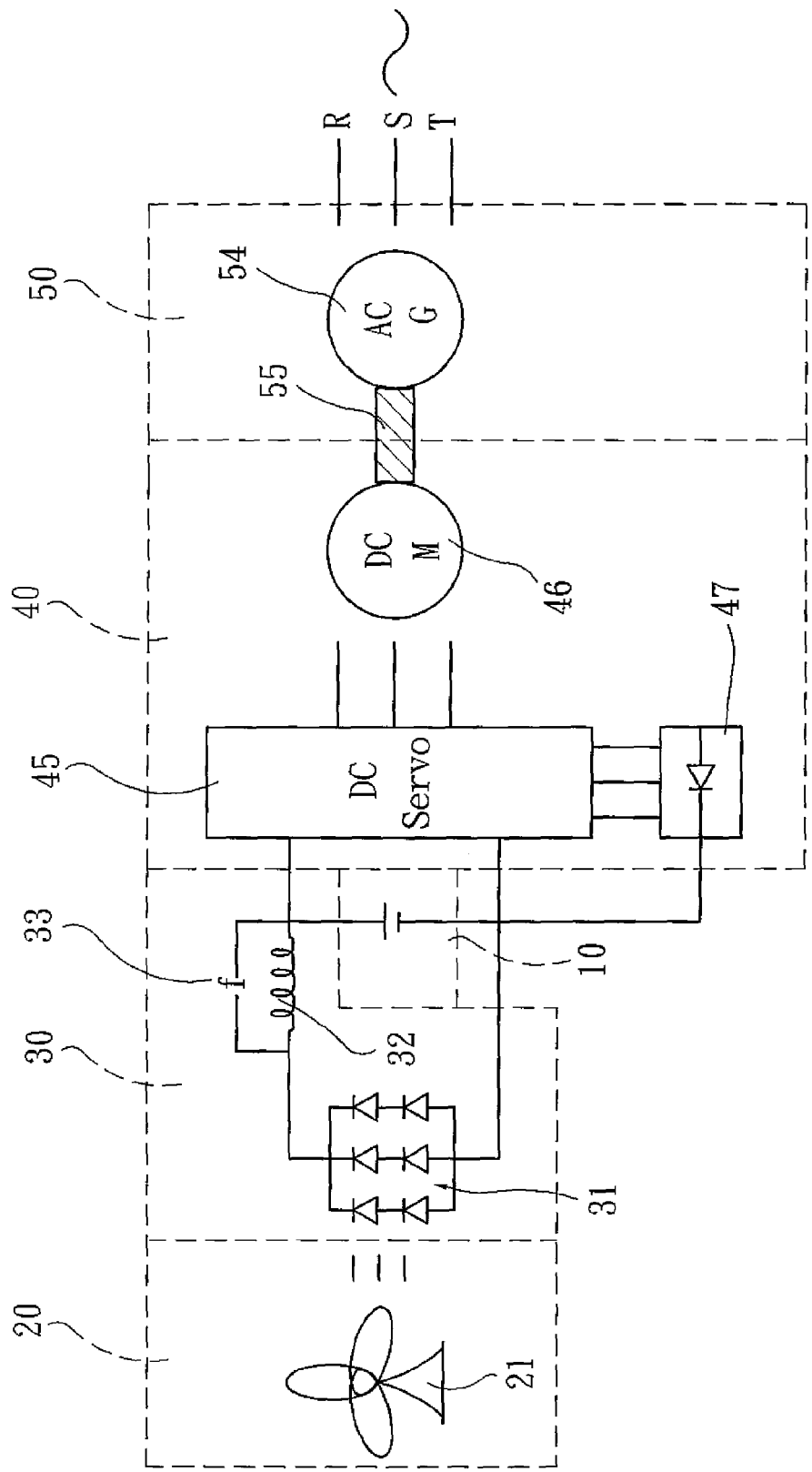
FIG. 5 is a structure diagram of a fourth embodiment of the present invention.

FIG. 5 is a structure diagram of a fourth embodiment of the present invention. In the fourth embodiment, the renewable energy generation unit 20 includes a wind turbine 21. The rectifying and charging unit 30 includes rectifiers 31, a susceptance-type inductor 32 and a high-frequency filter 33 for storing the electric energy in the buffer battery unit 10. The above action is actuated by the power conversion and energy multiplication unit 40, so that the electric energy is more quickly stored in the buffer battery unit 10. The power conversion and energy multiplication unit 40 includes a switching controller, such as a motor servo 45, and a DC permanent-magnet motor 46 driven by the motor servo 45 to operate. The motor servo 45 is an intermediate-frequency motor servo enabling quicker transmission of the electric energy to the buffer battery unit 10. The DC permanent-magnet motor 46 has an operating frequency higher than the frequency of normal electric power, and is able to couple out the electric energy. The electric power output unit 50 includes a low-frequency alternator 54, which and the DC permanent-magnet motor 46 are connected to each other via a common shaft 55 between them, so as to couple out the low-frequency normal electric power. The power conversion and energy multiplication unit 40 further includes an electrical damper 47 for timely absorbing any anti-electromotive force and eddy current produced due to a load effect, and recycling the absorbed anti-electromotive force and eddy current to form another renewable energy for reuse. In this manner, it is able to further increase the power efficiency of the renewable energy power plant.

Figure 6:
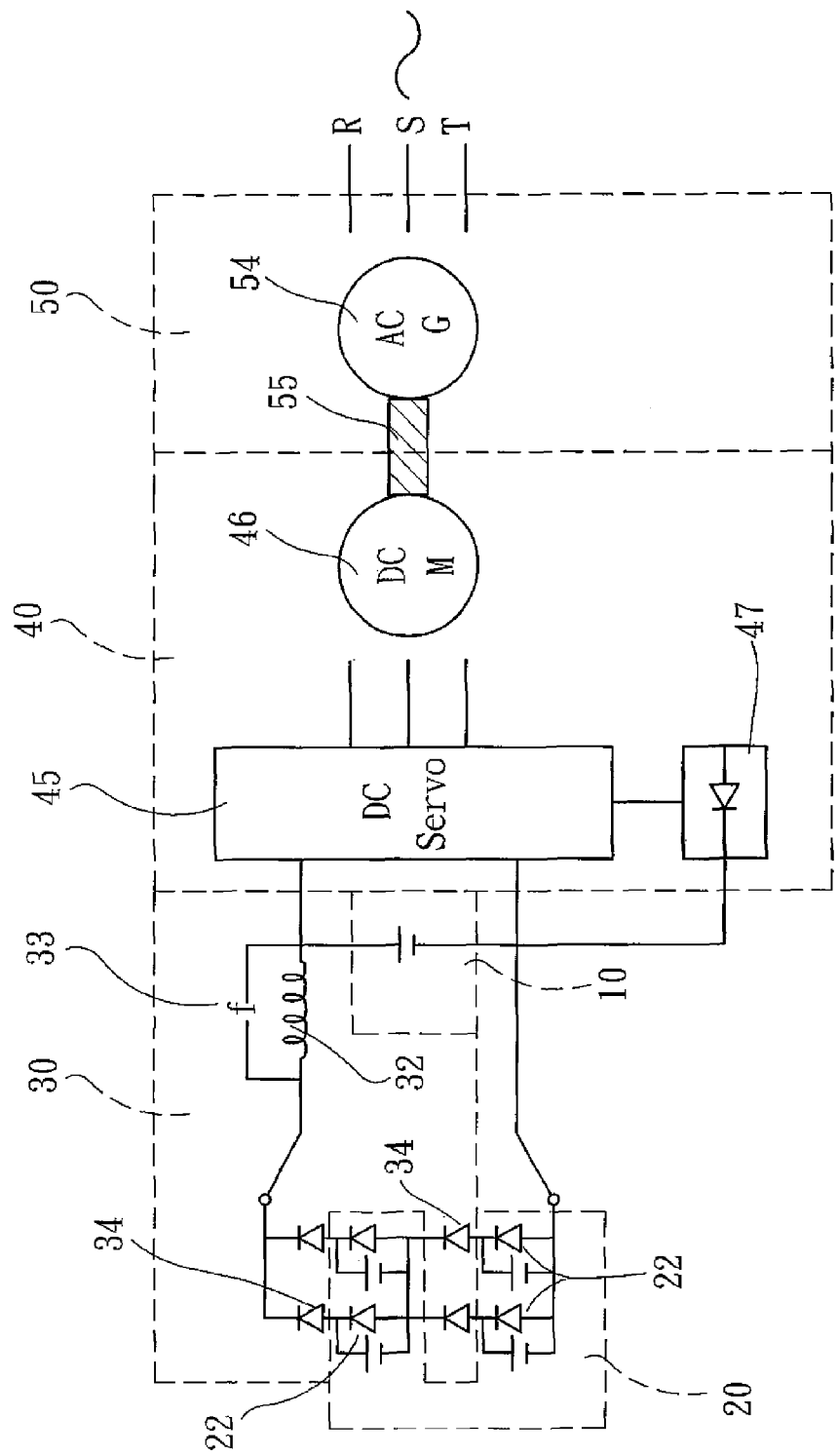
FIG. 6 is a structure diagram of a fifth embodiment of the present invention.

FIG. 6 is a structure diagram of a fifth embodiment of the present invention. The fifth embodiment is similar to the fourth embodiment, except that the renewable energy generation unit 20 includes a plurality of solar cells 22, and the rectifying and charging unit 30 includes rectifiers 34, a susceptance-type inductor 32, and a high-frequency filter 33. The rectifiers 34 in the rectifying and charging unit 30 may be arranged in the solar cells.

According to the mechanism of the present invention for outputting AC power, the DC permanent-magnet motor 46 and the motor servo 45 coordinately operate with the intermediate-frequency alternator 54 to together couple out electric power. Physically, power, rotary speed and torque are orthogonal to one another. When the rotary speed and the torque are respectively a fixed value, the power is also a fixed value. In other words, changes in the rotary speed and the output torque of the DC permanent-magnet motor 46 are the factors that determine the energy-to-power conversion efficiency.

With the renewable energy enhanced apparatus according to the present invention, electric energy output from the renewable energy is converted into electric power output. More specifically, the power conversion and energy multiplication unit enables increased electric energy storage speed and converts electric energy into electric power output, and the electric power output unit converts the electric power output of an intermediate frequency into the low-frequency normal electric power for use as power supply. The present invention also includes a damper to timely absorb or eliminate any produced anti-electromotive force or eddy current, which is recycled for reuse, so as to further increase the power efficiency of the renewable energy power plant.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A renewable energy enhanced apparatus, comprising:
 a renewable energy generation unit capable of generating electric energy in the form of a cell from renewable energy;
 a buffer battery unit being a rechargeable battery that can be repeatedly charged and discharged;
 a rectifying and charging unit including rectifiers and a susceptance-type inductor; the rectifiers converting the electric energy generated by the renewable energy generation unit and input to the rectifying and charging unit into direct current (DC), and the susceptance-type inductor charging the converted DC into the buffer battery unit;
 a power conversion and energy multiplication unit being a controller having an operating frequency higher than a frequency of normal electric power to enable the electric energy to be stored in the buffer battery unit at an increased speed, and being able to convert the electric energy into electric power to thereby couple out the electric power; and
 an electric power output unit for converting the electric power output by the power conversion and energy multiplication unit into low-frequency normal electric power output.

2. The renewable energy enhanced apparatus as claimed in claim 1, wherein the buffer battery unit includes a buffer battery, and a buffer capacitor connected to the buffer battery in parallel.

3. The renewable energy enhanced apparatus as claimed in claim 1, wherein the rectifying and charging unit further includes a high-frequency filter connected to the susceptance-type inductor in parallel.

4. The renewable energy enhanced apparatus as claimed in claim 1, wherein the power conversion and energy multiplication unit includes an intermediate-frequency converter having an operating frequency higher than the frequency of normal electric power, and an intermediate-frequency transformer coordinately operating with the intermediate-frequency converter; the intermediate-frequency converter being a DC-to-AC converter enabling transmission of the electric energy to the buffer battery unit at an increased speed; and the intermediate-frequency transformer being able to couple out the electric power.

5. The renewable energy enhanced apparatus as claimed in claim 4, wherein the power conversion and energy multiplication unit further includes an electrical damper for absorbing any anti-electromotive force and eddy current produced due to a load effect, and recycling the absorbed anti-electromotive force and eddy current to form another renewable energy.

6. The renewable energy enhanced apparatus as claimed in claim 1, wherein the electric power output unit includes a low-frequency inverter having an operating frequency the same as the frequency of normal electric power, and a low-frequency transformer coordinately operating with the low-frequency inverter; the low-frequency inverter being a DC-to-AC inverter, and coordinately operating with the low-frequency transformer to output the low-frequency normal electric power.

7. The renewable energy enhanced apparatus as claimed in claim 1, wherein the power conversion and energy multiplication unit includes a motor servo, and the electric power output unit is a low-frequency alternator having an operating frequency the same as the frequency of normal electric power; the motor servo driving a DC permanent-magnet motor to operate, and the operating DC permanent-magnet motor in turn driving the low-frequency alternator to operate, so as to couple out the electric power.

8. The renewable energy enhanced apparatus as claimed in claim 7, wherein the power conversion and energy multiplication unit further includes an electrical damper for absorbing any anti-electromotive force and eddy current produced due to a load effect, and recycling the absorbed anti-electromotive force and eddy current to form another renewable energy.

9. The renewable energy enhanced apparatus as claimed in claim 1, wherein the renewable energy generation unit is selected from the group consisting of a wind turbine and solar cells.

10. The renewable energy enhanced apparatus as claimed in claim 9, wherein the renewable energy generation unit includes a wind turbine and a solar cell; and the wind turbine and the solar cell are electrically connected in parallel circuit.

* * * * *